Oct. 9, 1951  A. E. LANGENBAHN  2,570,694
SELF-REGULATING STOCK TANK
Filed Aug. 11, 1947
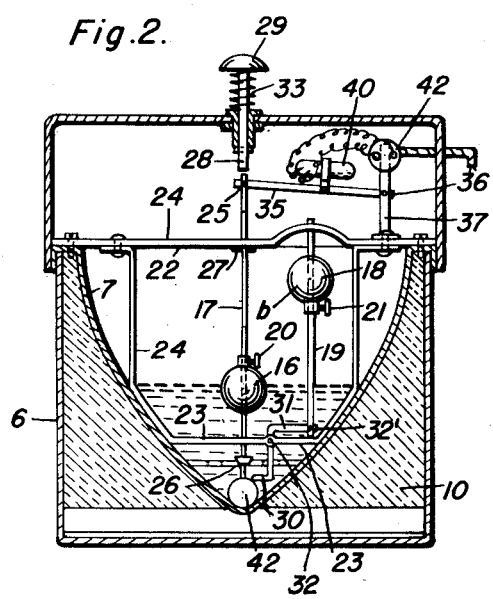
Fig.2.
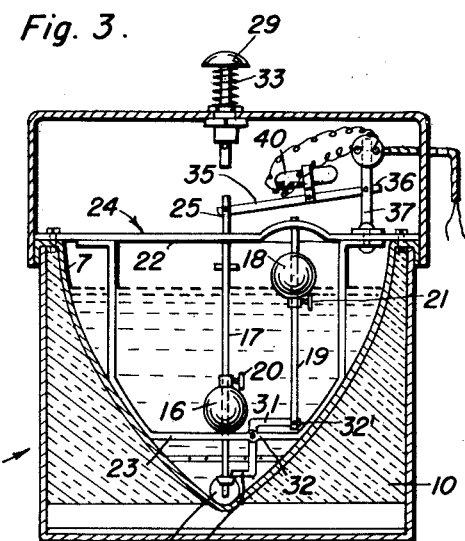
Fig. 3.
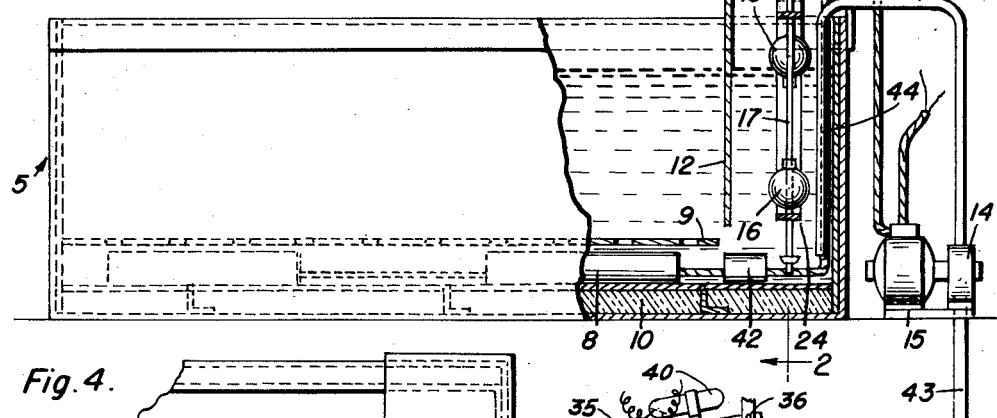
Fig. 1.
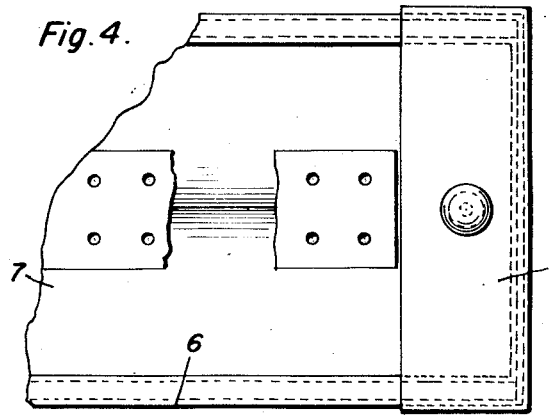
Fig. 4.
Fig. 5
Inventor
ALBERT E. LANGENBAHN
By *Clarence A. O'Brien
and Harvey B. Jacobson*
Attorneys Patented Oct. 9, 1951

2,570,694

UNITED STATES PATENT OFFICE 2,570,694

SELF-REGULATING STOCK TANK

Albert E. Langenbahn, New Holland, Ill.

Application August 11, 1947, Serial No. 768,045

4 Claims. (Cl. 119—78)

This invention relates to stock tanks as used in farms and ranches for watering livestock and it has for its primary object to provide a stock tank which is self-regulating in several different ways to be selected by an operator in accordance with existing conditions and which is therefore highly economical as regards water and heating energy supply.

It is a well known fact that stock tanks have to be heated during the cold season, and as this heat is produced by electric heaters, as a rule, and is partly wasted, it is important to keep the current consumption at a minimum. This can only be done if the quantity of water stored in the tank is kept at the minimum which will satisfy the needs.

The minimum quantity to be kept in a tank is however not a fixed one. It depends on the number of animals which have to be supplied with water, but also on the way in which the stock is kept. It is observable that stock which are allowed to feed without restriction do not require tanks of as large a capacity as stock which are kept temporarily within an enclosure. For instance, stock kept in a barn over night, when turned out, consume relatively large quantities at approximately the same time, and therefore have to be supplied by tanks of large capacity, while when grazing without restriction the different animals consume relatively small quantities at different times so that small tanks are sufficient. When stock tanks are to be kept at a minimum capacity for economical reasons these facts have to be taken into consideration and it is therefore an object of the invention not only to provide tanks which are ecnomical and self-regulating and which provide the minimum quantity of water and consequently require a minimum supply of electrical energy, but also means which permit to vary such minimum in a simple manner while keeping the tanks still under self-regulation for the selected minimum quantity of water.

A further object of the invention also consists in providing a stock tank of such shape that the quantity of water necessary to reach a certain minimum level above the heater is small when the self-regulated minimum capacity is small.

Further objects will be apparent from the following detailed specification describing by way of example an embodiment of the invention as illustrated in the accompanying drawing. It is to be understood that this illustrated embodiment of the invention was selected in order to be able to explain the construction principles on which the invention is based. This embodiment and its description, being merely one example, does therefore not attempt to give a survey of the various constructive modifications to which the invention may be subjected. Modifications of the embodiment shown do therefore not necessarily constitute a departure from the invention.

In the accompanying drawing:

Figure 1 is an elevational partly sectional view of the stock tank according to the invention, the section being taken along the longitudinal plane of symmetry.

Figures 2 and 3 are cross sectional elevational views of the section being taken along the line 2—2 of Figure 1. They show the regulating mechanism in two different positions.

Figure 4 is a partial top view of the stock tank.

Figure 5 is an elevational view of a modification in which the switch supporting member is operable by both float carrying members.

In order to obtain the greatest economy with respect to the heating of the water supply merely a minimum quantity should be kept in the tank and this quantity should be stored in such a way that the surface should not be over extended while as large a quantity of the water stored as possible should be available for consumption. This means that the quantity of water needed to keep the heater covered up to a level which is safe for the animals should be small. The self-regulating mechanism for keeping the water in the tank at such minimum has moreover to be adjustable in order to permit the variation of the minimum in accordance with conditions, as explained. As mainly two different ways of keeping stock are to be considered the mechanism provides a simple adjustment means for these two different ways.

In accordance with these principles the stock tank, according to the invention, which is generally designated by the reference numeral 5, comprises an outer shell 6 and an inner container shell 7, which consists of curved sections converging towards an apex, the cross section resembling somewhat that of a ship's hull. The electric heaters 8 which are at or near the lowermost point of the container shell 7 therefore, are arranged in a part of the container of very restricted cross section, so that the quantity of water necessary to keep them covered is small. Above the electric heaters 8 a nose guard 9 is arranged, consisting in a perforated sheet which prevents the cattle from reaching the lowermost portion of the container. Therefore the quantity of water available for drinking purposes is merely the quantity stored above the nose guard 9 but it will be seen that on account of the shape of the container 7 this quantity differs from the entire quantity held in the container only by a small percentage of the latter.

Moreover the shape of the container shell 7 permits to provide a very efficient heat insulation 10 which fills the space between the two shells 6 and 7 and which therefore insulates effectively especially the lower portion of the tank. The insulation contributes greatly to the economy of the arrangement.

At the end of the tank 5 a housing 11 is arranged which is separated from the tank itself by means of a partition wall 12, which however does not reach to the bottom but permits a free communication of the water. On the other side the housing is closed and is riveted, welded or otherwise fixed to the outer shell of the tank. This housing contains the regulating mechanism. It may be connected with the housing (not shown) of the pump 14 and pump motor 15 supplying the tank, if the latter units are arranged in immediate vicinity.

The self-regulating mechanism comprises two floats 16, 18, mounted on two rods 17, 19 in the example shown and adjustable thereon by means of set screws 20, 21.

The first float 16 is centrally mounted in the example shown and its rod 17 is guided in the upper and lower members 22, 23 of a frame 24 which may be screwed or riveted to the container within the housing. The rod 17 carries a lower and an upper stop member 26, 27. The former cooperates with a movable stop or catch 30 arranged on a bell crank lever 31, fulcrumed at 32 on the lower frame member 23 and pivoted to rod 19 of float 18 at 32'. When this stop is held in operative position it holds the stop 26 on rod 17 and prevents the float from rising. The upper pin 27 strikes against the upper member 22 of frame 24 when the float reaches its highest level and is arrested thereby.

The rod 17 of float 16 moreover reaches upwardly and at its upper end faces a push rod 28 seated in the upper part or cover of the housing 11. The push rod 28 carries a push button 29 and is held in its position by spring 33, which returns the push rod, if it should be pushed downwardly by means of the button 29.

At its upper end the rod 17 is moreover pivoted at 25 to a lever or link 35 having its fulcrum 36 in the standard 37, riveted or screwed to the frame 24. This lever 35 supports the mercury switch 40 and is so arranged with respect to rod 17 and fulcrum 36 that it starts to slope towards its fulcrum and tilts the mercury switch into its cut out position when the rod 17 reaches its highest position. In other positions the lever 35 is downwardly inclined towards the rod 17 and holds the switch in its operative or closed position.

A thermostatic device 42 may be provided which controls the admission of current to the heater. It makes the heater 8 operative if the water temperature has fallen below a predetermined range. Preferably a heater having a thermostat enclosed is used. In the drawing a separate thermostatic device 42 is shown for the sake of clearness.

The switch controls the admission of current to the electric motor 15 driving the pump 14. The latter is provided with a suction pipe 43 and a delivery pipe 44 reaching preferably downwardly so as to keep the delivery opening submerged.

The pumping equipment used is the standard equipment as used for these purposes.

The operation of the above described arrangement is the following.

Let it be assumed, for instance, that a small quantity of water is sufficient for existing conditions. The tank will then be filled to the extent shown in Figure 2 and the float 16 will be operative. It will be clear that with this adjustment the quantity of water stored and the surface exposed to the air are relatively small. The water is well insulated and the losses are small. When the float 16 reaches its top position the mercury switch 40 is tilted and the current to the electric motor 15 of the pump 14 is cut out. As soon as the water level drops the float lowers the rod 17, link 35 starts to slope downwardly towards the rod and the mercury switch is closed thereby operating the pump 14 which refills the tank.

Let it now be assumed that conditions change and that it is now desired to increase the minimum quantity of water kept in the tank. In this case the attendant pushes the button 29 downwardly. The push rod 28 will then push rod 17 downwardly and the stop member 26 will be caught by stop 30 of bell crank lever 31. The float 16 is thus rendered inoperative as a water level regulator, the tank will fill until the water level reaches the line marked in Figure 3 in which the water will start to lift float 18. When float 18 gradually is lifted bell crank lever 31 pivoted to rod 19 at 32' is turned around its fulcrum 32, the stop 30 is withdrawn and float 16 pushes rod 17 upwardly. Thereby mercury switch 40 is tilted and the current is interrupted, so that the tank now remains filled to a higher level.

The arrangement shown is intended to operate for a higher level (where a larger consumption of electric energy takes place) only once after hand operation. But it is manifest that, if desired, the arrangement may operate permanently at this level until readjusted by hand.

This may be done either by removing the float 16, if the change is a permanent one lasting for a long time or by using the arrangement shown in Figure 5 which is identical in every respect with the arrangement already described, except that rod 19 is longer and ends in a fork or head engageable with lever 35. Moreover push rod 17 also ends in a fork or head engageable with lever 35. If the dimensions of stop 26 and/or the length of the lever arms of bell-crank lever 31 are suitably chosen the float guiding and supporting the rod 19 lifts lever 35 to the extent necessary for operating the switch before the catch 30 is disengaged from the stop 26. The float 16 thus remains locked while the float 18 controls the operation, until lifted by hand to such an extent that the stop 26 is again unlocked. The lower float is then again operative until locked by the operation of the push rod 28.

However if any level higher than that shown is desired to be held permanently this may also be obtained by adjusting the position of float 16.

Practically therefore, on account of the adjustability of the floats all conditions arising in connection with stock raising may be taken care of, while at the same time the greatest economy in the consumption of current may be obtained.

It will be clear that minor changes in the constructive features described will not in any way lead to a departure from the invention.

Having described the invention, what is claimed as new is:

1. A stock tank assembly comprising a tank, a pump, a delivery pipe connecting said pump and said tank, an electric motor in operative driving connection with said pump, an electric supply circuit connected with said electric motor, including a switch with contacts closed and opened by a change of position of the switch, adapted to control said circuit, a switch position changing member associated with said switch, a float assembly connected with said tank with a float arranged near a predetermined lower water level, provided with a switch position changing member cooperating with the switch position changing member of the aforesaid switch, a locking means on said float assembly adapted to lock the same in a position below the position corresponding to the predetermined lower water level, a second float also connected with said tank and arranged at a predetermined higher water level, a further locking member operatively associated with said second float and adapted to cooperate with the first named locking means to lock the first named float in a position below the predetermined water level and to unlock it from this position, and a hand operated member engageable with said first named float assembly for bringing the first named float into the locking position, said first named float assembly, when locked, being controlled by the locking member operated by the second float, when the latter is raised above the higher predetermined water level.

2. A stock tank assembly comprising a tank, a pump, a delivery pipe leading from said pump to said tank, an electric motor associated with the said pump, an electric supply circuit for said electric motor including a switch with contacts closed and opened by a change of position of the switch, adapted to control said circuit, a member for changing the switch position, a float assembly connected with said tank, with a float arranged near a predetermined lower water level, and with a float guiding and supporting member attached to said float, said last named member projecting and being adapted to operate said position changing member of the switch when the float is raised above the predetermined lower water level, a stop on said guiding and supporting member, adapted to lock said supporting member and float in a position in which the float is below the predetermined water level, a locking member connected with said tank assembly engageable with said stop for locking and unlocking said first named float and supporting member, a second float arranged at a higher predetermined water level, said second float being operatively connected with said locking member, and moving the same into its unlocking position when raised above the predetermined higher level, and hand operated means adapted to bring the first named float into a locking position, thus making it inoperative until released by the second float.

3. A stock tank assembly comprising a tank, a pump, a delivery pipe leading from the pump to the bottom portion of the tank, an electric driving motor, associated with said pump, an electric supply circuit connected with said electric motor, including a switch with contacts closed and opened by a change of position of the switch, a position changing member connected with the said switch, said switch being opened when the position changing member is raised, a float assembly with a float arranged on a predetermined lower level of the water and with a float guiding and carrying member attached to said float and guided within said tank assembly, said member projecting from said tank and being adapted to raise said position changing member of the switch when the float is moved above its lower predetermined level, a member for adjusting the position of said float on said float guiding and carrying member, a stop on said float guiding and carrying member, disposed to lock said float below the predetermined lower water level, a retractible locking member for said stop fulcrumed within the tank assembly and adapted to lock said stop thus holding said float in its lowermost position, a second float arranged at a higher water level, a float guiding and carrying member attached to said second float, the aforesaid float guiding and carrying member being operatively connected with said retractible locking member and adapted to withdraw said locking member from its locking position when the said second float is raised above the higher predetermined water level, and a hand operated member engageable with said first named float assembly moving the first named float into its lowermost locking position in which the stop engages the retractible locking member and holds the first named float below the predetermined lower water level, with the float guiding and carrying member disengaged from the position changing member of the switch, the switch contacts being closed in this position to energize the electric motor driving the pump delivering water into the tank, said switch contacts controlling the electric motor being opened, when the second float is raised above the higher predetermined water level, disengaging the retractible locking means from the stop and making the first named float assembly operative to raise the position changing member of the switch.

4. A stock tank assembly comprising a tank, a pump, a delivery pipe leading to the bottom portion of the tank, an electric motor in operative driving connection with said pump, an electric supply circuit connected with said electric motor, including a mercury switch provided with contacts, a tiltable support carrying said mercury switch, pivotally held on the tank assembly, the support when tilted, adapted to move the mercury switch either into a position in which the contacts are closed or into a position in which the contacts are open, a float assembly including a float and a float carrying and guiding member attached to said float, slidably mounted within said tank assembly and provided with a free end projecting upwardly, said free end being engageable with and, when raised, tilting said pivotally mounted switch support, a stop on said float carrying member, disposed to hold the float in a position below the predetermined lower level, a retractible locking member provided with a catch, fulcrumed within the tank assembly and adapted to hold and to lock said stop and float in a position below that corresponding to the lower predetermined level, a second float arranged near a higher predetermined water level, a float guiding and carrying member attached to said second float and guided within the tank assembly, said second float guiding and carrying member being operatively connected with the retractible locking member and upon being raised by the second float beyond the level to which the second float is adjusted, withdrawing the catch from said stop on the first named float guiding and carrying member of the first named float, a push rod mounted on the tank assembly above and engageable with the first named float guiding and carrying member of the first named float, said push rod when pressed toward the float guiding and carrying member moving the same downwardly until its stop has been caught by the catch of the locking member, the mercury switch in this position closing the supply circuit of the pump driving electric motor until tilted by the raising of the second float above the predetermined higher level, and the release of the stop locking the first named float.

ALBERT E. LANGENBAHN.

REFERENCES CITED

The following references are of record in the file of this patent:

UNITED STATES PATENTS

| Number | Name | Date |
| --- | --- | --- |
| 744,817 | Sundh | Nov. 24, 1903 |
| 1,251,590 | Stewart | Jan. 1, 1918 |
| 1,419,352 | Boe | June 13, 1922 |
| 1,488,086 | Zieglowsky | Mar. 25, 1924 |
| 1,760,382 | Teesdale | May 27, 1930 |
| 1,793,431 | Pelmulder | Feb. 17, 1931 |
| 2,133,388 | Henderson | Oct. 18, 1938 |
| 2,230,085 | Ortgiesen | Jan. 28, 1941 |
| 2,297,030 | Snyder | Sept. 29, 1942 |